United States Patent [19]
Hartzell et al.

[11] 3,747,455
[45] July 24, 1973

[54] SAWMILL

[75] Inventors: George W. Hartzell; Robert J. Gunnerman, both of Piqua, Ohio

[73] Assignee: Hartzell Industries, Inc., Piqua, Ohio

[22] Filed: June 14, 1971

[21] Appl. No.: 152,751

[52] U.S. Cl.................. 83/403.1, 83/708, 83/433, 83/435.1
[51] Int. Cl........................ B27b 7/00, B27b 29/10
[58] Field of Search.................. 143/50, 37 R, 37 B, 143/38, 117, 105 B, 39, 48; 83/403.1, 433, 435.1, 708

[56] References Cited
UNITED STATES PATENTS

| 2,803,272 | 8/1957 | Crosby | 143/37 B |
| 775,576 | 11/1904 | Neubert | 143/38 R |
| 2,795,933 | 6/1957 | McCallum | 143/32 P |
| 1,093,680 | 4/1914 | Beck et al. | 143/50 |
| 3,129,733 | 4/1964 | Dargan et al. | 143/37 R |

*Primary Examiner*—Donald R. Schran
*Attorney*—William R. Jacox and Alan F. Meckstoth

[57] ABSTRACT

The specification discloses a sawmill arrangement in which a log carriage is provided which is suspended from a horizontal rail located above the carriage with the log being suspended on the carriage therebeneath. The carriage has dogging elements thereon to engage the ends of the log and which are rotatable for turning the log. Controls are provided for controlling the reciprocation of the log carriage and the feeding of the saw toward and away from the path of the log. Two saws may be employed, one running on each side of the center of the mill for cutting slabs or boards from both sides of the log. Each saw may have associated therewith edging saws for edging the slabs or boards taken by the main saws of the machine.

19 Claims, 11 Drawing Figures

INVENTORS
GEORGE W. HARTZELL
ROBERT J. GUNNERMAN

FIG-9

SAWMILL

The present invention relates to sawmill equipment, and is particularly concerned with equipment for sawing logs in a longitudinal direction to take boards, or slabs, therefrom.

Sawmill equipment of the nature referred to is known and, in general, comprises a carriage on which a log is supported and which moves in the longitudinal direction past a saw blade which takes longitudinal cuts in the log and thereby divides it into boards, or slabs.

A primary object of the present invention is the provision of a sawing arrangement of the nature referred to in which it is more convenient to operate than heretofore known devices and which will operate rapidly and produce accurate results.

A still further object is the provision of a sawing arrangement of the nature referred to in which the minimum amount of weight is driven with the log when the log is reciprocated relative to the sawing station.

Still another object is the provision of an arrangement for sawing logs in which the log can be indexed accurately so it can be sawed in at least two angularly related regions.

Still another object is the provision of a sawing arrangement of the nature referred to in which the logs to be treated can be accurately positioned in the gripping arrangement therefor to provide for the best sawing conditions.

Other objects and advantages will become apparent upon reference to the following detailed specification, taken with the accompanying drawings, in which:

Figure 1:
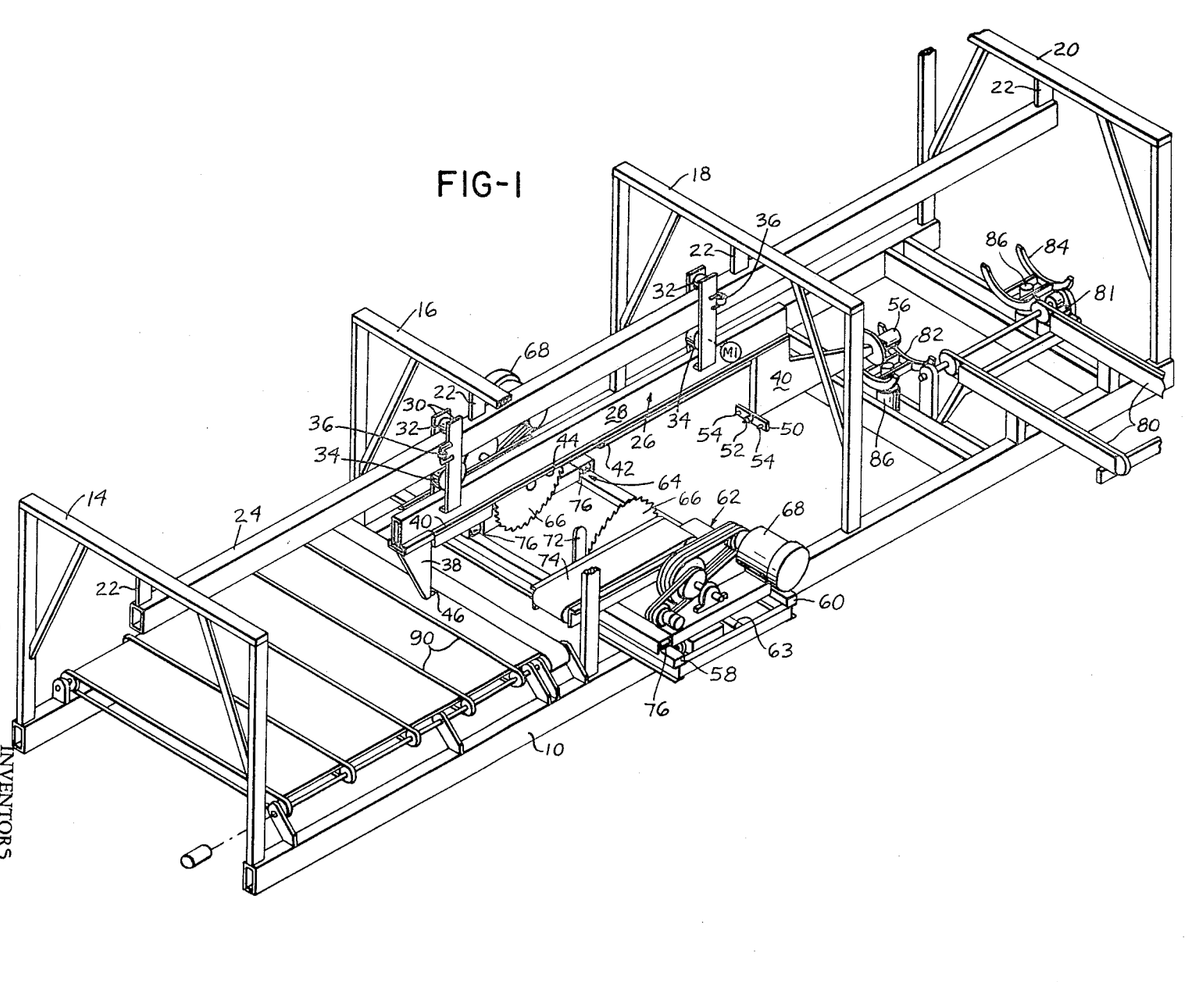
FIG. 1 is a perspective view showing a sawmill arrangement according to the present invention without a log therein.
Figures 2, 3:
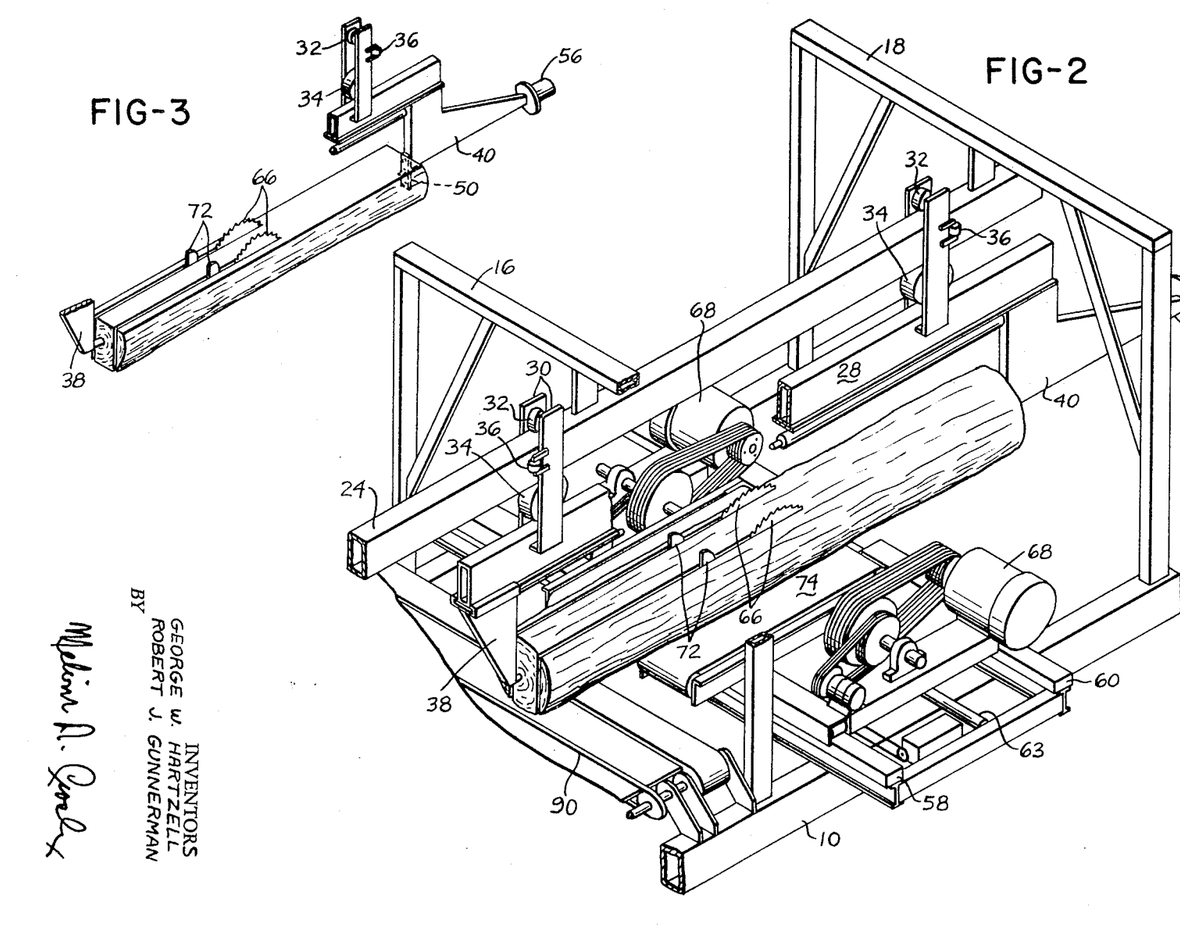
FIG. 2 is a fragmentary view of the sawmill of FIG. 1 showing a log supported in the log carriage and partly sawed.
FIG. 3 is a fragmentary view showing the manner in which a log can be indexed after having cuts taken on at least one of two opposite sides thereof so as to take cuts on at least one of the sides of the log related to the sawed sides by an angle of 90°.

Referring to the drawings more in detail, the sawmill illustrated in FIG. 1 comprises a pair of spaced base rails 10 and 12 adapted for being fixedly mounted as on a floor or the like. Secured to and upstanding from base rails 10 and 12 are frames 14, 16, 18 and 20 spaced in the longitudinal direction along the base rails 10 and 12 and each comprising vertical side columns and a horizontal head piece and brace members extending between the head piece and the side columns to present a substantially rigid structure.

Secured to each of the head rails of the aforementioned frames in about the center thereof and depending therefrom is a support member 22 which, at the lower end, is fixed to about the center of the upper side of a tubular rectangular rail member 24. Rail member 24 forms a rail on which the log supporting carriage of the sawmill is reciprocably mounted. Inasmuch as the aforementioned frames are substantially rigidly supported, it follows that rail member 24 forming the carriage rail is also rigidly and strongly supported.

The carriage of the sawmill is generally indicated by reference numeral 26 and comprises an elongated substantially rigid top member 28 parallel to rail member 24 and positioned therebeneath. Fixed to upper member 28 on the opposite sides thereof and extending upwardly therefrom are members 30 arranged along top member 28 in longitudinally spaced relation.

Members 30 carry rollers 32 engaging the top of rail member 24 in the regions thereof at the sides of members 22 and rollers 34 which engage the underneath side of rail member 24. The last mentioned rollers may advantageously be resilient rubber-like rollers, and this will maintain rollers 32, which are of metal, firmly against the top surface of rail member 24 to provide for accurate guiding of the carriage 26 in the direction of the length of rail member 24.

Members 30 upstanding from top member 28 furthermore comprise rollers 36 engaging the side faces of rail member 24 so that the carriage 26 is held against lateral movement on rail member 24 and also against any swinging movement thereon. As many sets of the said rollers could be provided as desired for the support of the log supporting carriage.

Reciprocation of carriage 26 along rail member 24 can be accomplished by any suitable sort of driving mechanism, and purely by way of illustration, a motor M1 is schematically illustrated connected to one of the resilient rolls 34. The motor can be connected with the roll through a suitable gear transmission to reduce the motor speed to the speed desired for roll 34 and the transmission may, for example, include worm wheel drive means to provide for stability in the rate of movement of the carriage 26 as it is driven longitudinally along member 24.

Preferably, the rollers 34 are in the form of hydraulic motors having a stationary inner part and a rotatable outer part on which is mounted a heavy rubber-like tire that engages the underside of the rail member 24.

At each end of carriage 26, dependent from the underside of top member 28, is a support bracket. At the left end of member 28, as it is viewed in FIG. 1, the support bracket 38 is slidable on a bottom flange member 40 provided on member 28 and is actuated in opposite directions of movement therealong by a fluid motor comprising a cylinder 42 carried on the underneath side of member 28 and a plunger 44 reciprocable in the cylinder and connected to bracket 38.

Support bracket 38 near the bottom has a pointed dog element 46 extending toward the opposite end of top member 28.

At the opposite end of top member 28 from support bracket 38 is the other support bracket, indicated at 48, and having rotatably mounted thereon a bar-like dogging member 50, the center point of which is coaxial with dogging point 46 on bracket 38. Dogging member 50 in addition to the center dogging element 52 thereon has lateral dogging elements 54 so that the element 50 can be rotated to rotate a log gripped thereby.

As will be seen hereinafter, a motor 56, preferably a hydraulic motor, is provided for rotating dogging member 50 and controls are provided to provide for predetermined indexed positions of dogging member 50, specifically, with member 50 horizontal and vertical.

In about the center of the length of the sawmill, transverse rails 58 and 60 are provided, extending parallel to each other and at right angles to base rails 10 and 12 and spaced in the direction of the length of the sawmill. Mounted on rails 58 and 60 are saw carriages, or husks, generally indicated at 62 on the near side of the machine in FIG. 1 and at 64 on the far side of the machine. Each husk is provided with rollers 76 engaging the rails 58 and 60 to support and guide the husks without lost motion on the rails.

Each of these husks, on the end toward the center of the machine, carries a main saw blade 66 adapted for being driven by a drive motor 68 via belting 70. Immediately adjacent each saw blade 66 in the direction of the travel of logs being sawed is an upstanding blade 72 forming a splitter and tipper, which enters the saw cut being taken and maintains such conditions that each saw blade can rotate freely and expend the driving energy supplied thereto in the sawing operation and which also provides for the boards, or slabs, to tip outwardly to the off bearing conveyor when free of the log.

A belt conveyor 74 can also be provided adjacent each saw blade for conveying boards, slabs and edging strips away from the respective sawing station.

Each saw husk is mounted on rails 58 and 60 and is advanced toward and away from the center of the sawmill by a piston and cylinder arrangement 63 to which the supply of fluid is controlled by a control system.

Each saw drive motor is also belted to a pump 69, a double pump, for example, which develops fluid under pressure for driving the hydraulic components of the machine.

For introducing logs into the sawmill, there is provided, near one end of the structure and disposed between frames 18 and 20, a belt, or chain, conveyor arrangement 80, driven by a motor 81, which receives logs at the outer end outside the limits of the frame of the machine and conveys the logs inwardly toward the center of the machine and delivers the logs to cradles 82 and 84.

Each cradle is supported on a vertically moveable hydraulic piston and cylinder arrangement 86 so that a log in the cradle can be adjusted to bring the center line thereof to the proper level for dogging the log in the log carriage. Preferably, the dogs at opposite ends of the log engage the log in about the center of the respective end of the log. It is customary to provide viewing mirrors adjacent the dogging arrangements at the ends of the log so that an operator in a control position can observe the position of the dogs relative to the log and actuate piston cylinder means 86 to get the log into the proper position for dogging.

Prior to introducing a log into cradles 82 and 84, log carriage 26 is moved into such position that a log introduced into the cradles will be positioned between the dogs thereof. Thereafter, the cylinder piston means 86 are actuated to position both ends of the log at the proper heighth and then fluid can be supplied to cylinder 42 to drive bracket 38 toward bracket 48 and thereby engage the opposite ends of the log by the dogs carried by the respective brackets. Thereafter, the cradles 82 and 84 can be lowered and, if desired to rotate the log to a starting position, the log is rotated, the cradles lifted to support the log, and the dogs disengaged and rotated to a starting position. The dogs are then reengaged with the log and the cradles lowered and sawing can commence.

As to the pieces cut from the log when they are moved past saw blades 66, these pieces are carried with the logs until severed from the log and, at this time, the pieces will be disposed over a lateral off bearing conveyor arrangement 90 which will receive the boards, or slabs, and deliver the cut off boards, or slabs, laterally out of the machine in the region between frames 14 and 16.

Figure 4:
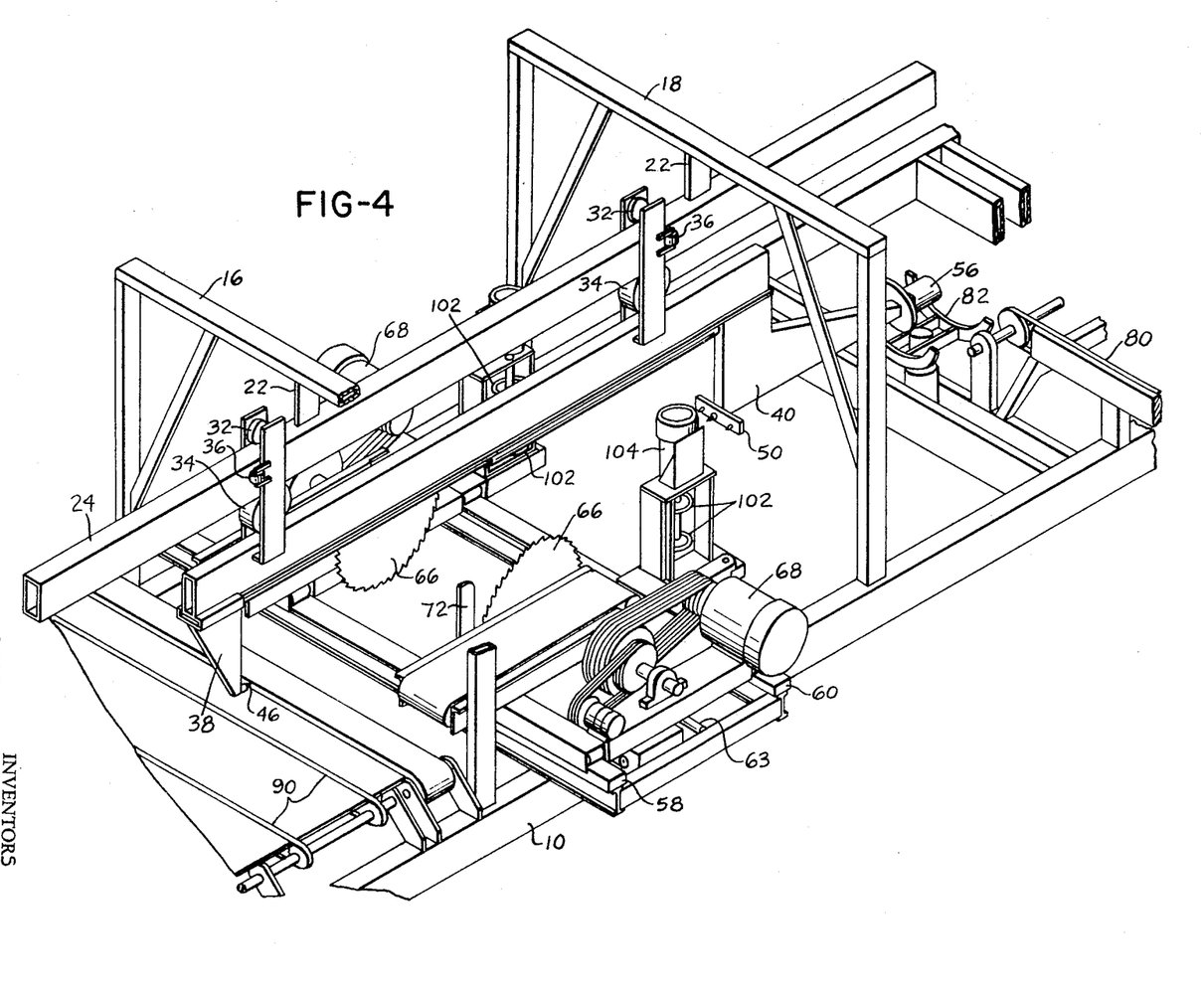
FIG. 4 is a fragmentary view similar to FIG. 1 but showing edging saws mounted on the saw carriages, or husks, and operable for edging boards taken from a log by the main saws on the saw carriage.

In case the boards cut from the logs are to be edged, each sawmill carriage supports a frame 100 in which there are the spaced edging saws 102 driven by motor 104 and adapted for trimming off the top and bottom edges of a board.

Saws 102 are vertically adjustable to provide for the desired lateral dimension on the board being cut. Saws 102, for example, may have hydraulic adjusting motors connected thereto for vertical adjustments of the saws to trim the boards, or to produce dimensioned boards.

Further, the frames in which the edging saws are mounted are moveably connected to the respective husks so as to be adjustable between effective and ineffective positions.

Figures 5, 7:
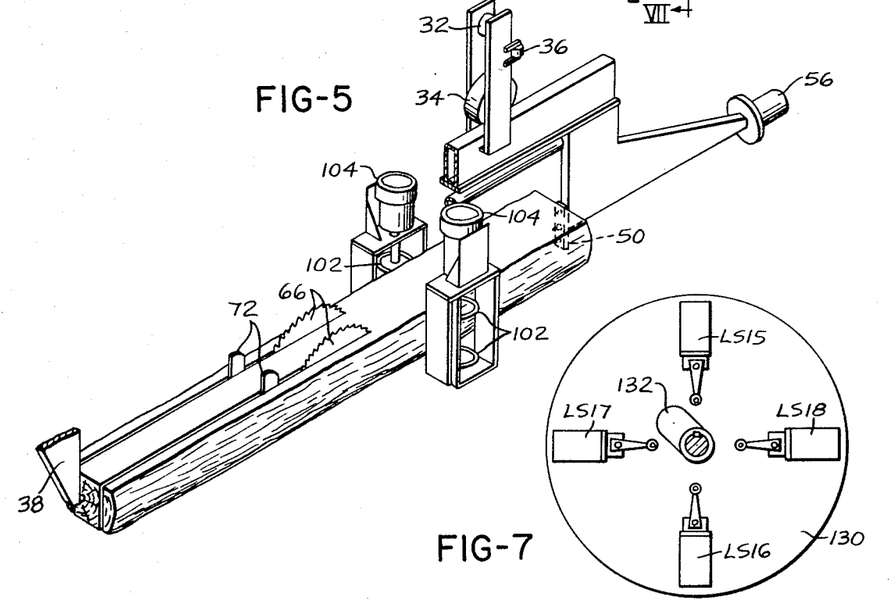
FIG. 5 is a fragmentary perspective view showing the edging saws of FIG. 4 in operation.
FIG. 7 is a sectional view taken on line VII—VII showing a cam and limit switch arrangement for controlling the indexing of the dog of FIG. 6.

FIG. 5 illustrates the manner in which the edging saws operate and wherein the boards 106 taken off the sides of log 108 have the top and bottom edges thereof trimmed off and squared by the removal therefrom of strips 110 taken by the saws 102. The saws 102 preferably extend completely through the thickness of the board being cut and into the region where a kerf will be taken along the log by the main saw blades 66.

Figure 6:
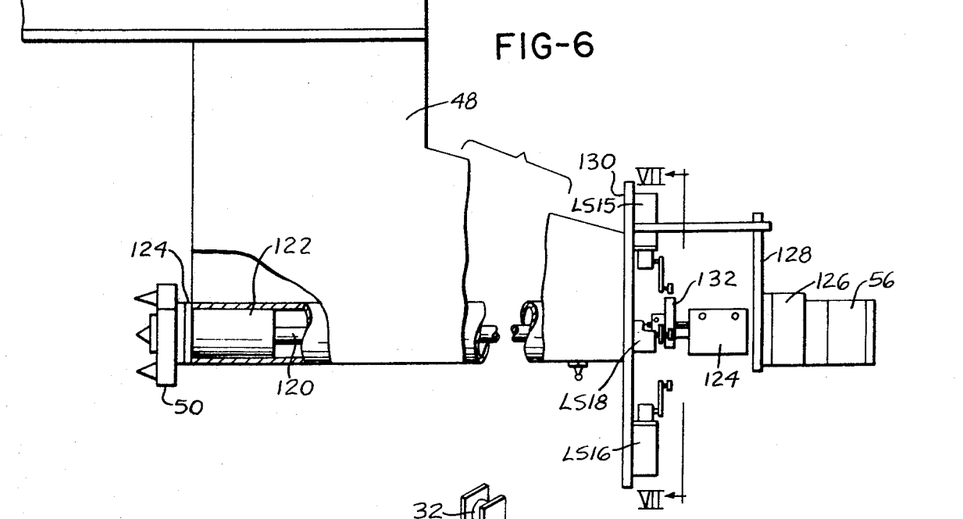
FIG. 6 is a fragmentary view showing one of the dogs between which a log is supported and, specifically, the indexable dog.

With regard to the rotatable dogging member 50 carried by bracket 48, the arrangement of this portion of the structure is illustrated more in detail in FIGS. 6 and 7. FIG. 6 will show that dogging member 50 is mounted on a shaft 120 journaled adjacent the dogging member 50 in a sleeve bearing 122 while a thrust bearing 124 is provided between bracket 48 and dogging member 50 to sustain the dogging forces developed by the supply of pressure to cylinder 42.

Shaft 120 extends through bracket 48 and, at the end opposite dogging member 50, is connected through a coupler 124 with the output shaft of a gear unit 126, the input shaft of which is driven by the aforementioned motor 56. Motor 56 and transmission 126 may form a unit mounted on a torque arm 128 that is fixedly secured to a plate 130 mounted on bracket 48.

The plate 130 has mounted thereon a plurality of limit switches LS15, LS16, LS17 and LS18 which are distributed at 90 degree intervals about plate 130 as will be seen in FIG. 7. Each of these switches has an actuating element projecting toward the axis of shaft 120 and keyed to shaft 120 is a cam 132 for actuating each of the said limit switches as shaft 120 rotates.

By means of a suitable control system, to be described hereinafter, the aforementioned limit switches provide for four indexed positions of dogging member 50 and, thereby, four indexed positions of a log dogged in the carriage 26.

Figure 8:
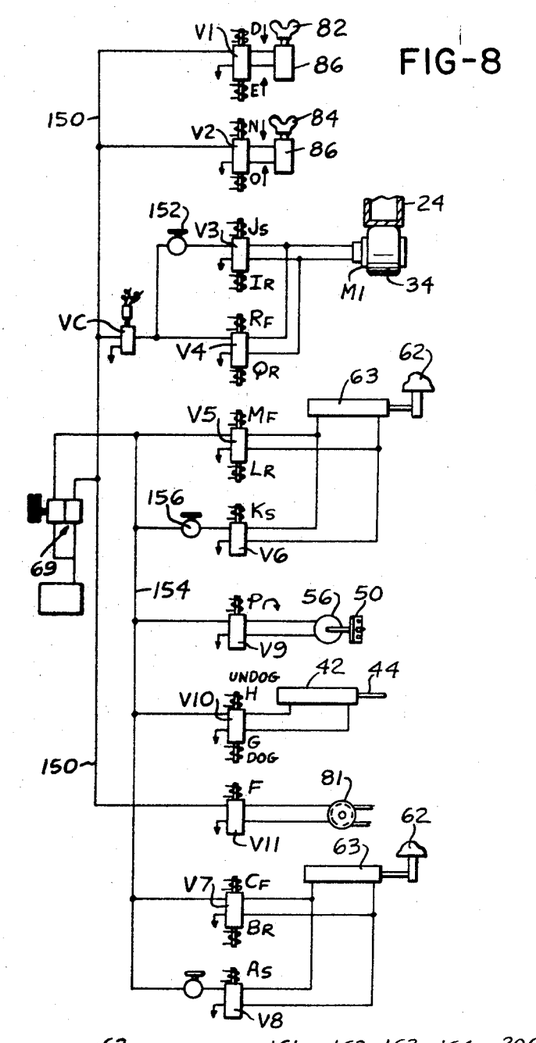
FIG. 8 is a schematic representation of a hydraulic control circuit for the machine.

FIG. 8 schematically illustrates the hydraulic control circuit for the machine. In FIG. 8, only one of the saw motor driven pumps is illustrated, but it will be understood that there are two thereof, and they can be interconnected in any desired manner. Pump 69, as mentioned, is a two-part pump and each one of the sections of the pump supplies certain ones of the hydraulic auxiliaries.

At the top of FIG. 8, the cradles 82 and 84 and the actuating motors 86 are illustrated, and connected between each of the motors and a fluid supply line 150 leading from one section of pump 69 is a closed center reversing valve, the valves being identified at V1 and V2. Valve V1 for cradle 82 is controlled by a pair of solenoids D for downward movement of the respective cradle and E for upward movement thereof.

Valve V2 is similarly under the control of two solenoids, N for downward movement of the respective cradle and O for upward movement thereof. Each cradle stays in its adjusted position when both of the solenoids pertaining to the control valve are deenergized.

The log carriage driving motors M1, only one of which is shown in FIG. 8, are connected to pressure line 150 via control valves V3 and V4, each of which are closed center reversing valves. The supply line for valve V3 includes a restrictor 152 to control the rate of fluid flow therethrough to obtain slow rotation of motor M1 and, thus, slow travel of log carriage 26.

Valve V3 has a solenoid J energizable to give forward motion of motor M1 and a solenoid I energizable to give reversible rotation thereof. Similarly, valve V4 has solenoid R for forward movement and solenoid Q for reverse motor movement. Forward movement in this case means movement of the log carriage during a sawing operation and reverse movement means retraction of the carriage preparatory to another sawing operation. When only valve V3 is active, motor M1 operates at reduced speed, but when both valves V3 and V4 are shifted by energization of both solenoids J and R, motor M1 will rotate at high speed.

A further control valve VC, to be described hereinafter, is included in the supply line leading to valves V3 and V4.

The fluid motors 63 for the husks 62 and 64 are connected to another pressure line 154 via control valves. The one motor 63 has control valves V5 and V6. Valve V5 is a closed center reversible valve having a solenoid M which will produce forward movement of the respective husk toward the center of the machine and a solenoid L to produce retracting movement thereof.

Valve V6, which may be a closed center valve shiftable in only one direction, has an actuating solenoid K, which will produce slow advancing movement of the respective husk. The supply line leading to valve V6 may have a restrictor element 156 therein to control the rate of fluid flow therethrough.

The fluid motor for the other of the said husks is provided with a valve V7, corresponding to aforementioned valve V5, and having a forward control solenoid C and a reverse control solenoid B. A further valve V8 is connected to the last mentioned husk motor and corresponds to the aforementioned valve V6 and has an actuating solenoid A to produce slow advancing movement of the respective husk.

The aforementioned fluid motor 56 for rotating dogging element 50 is connected to pressure line 154 via a valve V9 having a solenoid P which, when energized, will cause rotation of motor 56.

The dog actuating cylinder 42 is connected to pressure line 54 via a valve V10 having a solenoid G energizable to cause the dogs to engage a log and a solenoid H energizable to cause the dogs to release a log.

Finally, fluid motor 81, for the conveyor which carries logs to the cradles, is connected with line 150 via a valve V11 having a solenoid F energizable to cause motor 81 to rotate.

As to the electrical circuit of FIG. 9, the several solenoids referred to in connection with FIG. 8 are shown connected between power lines L1 and L2 in series with switches and contactors, as will be described hereinafter.

A manual switch arrangement identified JS has a moveable blade connected to power line L1 through normally closed relay blades CB1 and normally open relay blades CD1 in parallel therewith.

The moveable blade of switch JS is closeable upon a contact JS1 to energize solenoid J to produce slow speed travel of log carriage 26 in sawing direction and is closeable on a contact JS2 to energize solenoids I and Q thereby to produce rapid retracting movement of the log carriage. The moveable blade of switch JS is also closeable on contacts JS3 and JS4 at one time to energize both of solenoids J and R thereby to produce rapid advancing movement of the log carriage.

Solenoid L for reversing one of the husks is under the control of a normally open push button PB1, which is in series with a normally closed limit switch LS1. Switch LS1, as will be seen, limits the outward movement of the respective husk.

A second push button PB2 has one blade in series between lines L1 and L2 with a relay solenoid CA which controls a normally open blade CA1 and a normally closed blade CA2.

A second blade of push button PB2 is connected on one side to line L1 and on the other side is connected by a wire 160 with one side of the normally closed blade of a two-bladed limit switch LS2, the other blade of which is normally open. The opposite side of the normally closed blade of limit switch LS2 leads to one side of each of the normally closed limit switches LS3 and LS4, the other sides of which are connected together and to one side of each of the aforementioned relay blades CA1 and CA2. The opposite side of blade CA1 is in circuit via valve solenoid K with line L2, and the other side of blade CA2 is connected to line L2 via valve solenoid M.

A third push button PB3 is connected in bypassing relation to the blade of push button PB2 and controls the connection of L1 to wire 160.

A fourth push button PB4 has a normally open blade connected between line L1 and one side of each normally closed limit switches LS7 and LS12, the other sides of which are connected to one side of each of the toggle switches T1 and T2 with the other side of toggle switch T1 being connected to the terminal of switch LS2 to which line 160 leads. This last mentioned blade at LS2, which is normally closed, is bypassed by a normally open relay blade CD2.

A second normally open blade and push button PB4 is connected between line L1 and one side of each of a pair of full wave rectifiers R1 and R2, the other sides of which are connected to line L2. Rectifier R1 supplies a clutch coil MC1 and rectifier R2 supplies a clutch coil MC2.

Two further push buttons PB5 and PB6 are arranged in the same manner as push button PB4, except that the one blades thereof are in circuit with limit switches LS8 and LS11 for push button PB5 and with LS9 and LS10 for push button PB6.

A still further push button PB7 has one normally open blade connected between line L1 and a wire 162 leading to one side of the normally closed blade of a two-blade limit switch LS13, the other blade of which is normally open. The normally closed blade of limit switch LS12 is bypassed by normally open relay blade CD3.

Wire 162 leads to the side of the normally closed blade of LS13 to which one side of toggle switch T2 is connected. The other side of the normally closed blade of limit switch LS13 is connected to one side of the parallel arranged normally closed blades of limit switches LS5 and LS6, the other sides of which are connected to one side of normally closed relay blades CC1 and normally open relay blades CC2. The other side of blade CC1 is connected to line 62 via valve solenoid A and the other side of blade CC2 connected to line 62 via valve solenoid C.

The normally open blades of limit switches LS2 and LS13 are connected on one side to power line L1 and on the other side are connected together and through the coil of a relay CB to line L2. Relay CB controls the normally closed blade CB1 which is in series with switch JS.

A second blade of push button PB7 is connected between lines L1 and L2 in series with the coil of a relay CC which controls the aforementioned blades CC1 and CC2.

A further push button PB8 is connected between line L1 and wire 162 so as to bypass the first mentioned blade at push button PB7.

A further push button PB9 is connected between power line L1 and one side of a normally closed limit switch LS14, the other side of which is connected through valve solenoid V to power line L2. Solenoid LS14, similarly to solenoid LS1 limits the retracting movement outwardly of one of the husks of the machine.

The two aforementioned limit switches LS15 and LS16, each of which is actuated in a respective vertically disposed position of dog element 50, each has a normally closed blade and a normally open blade. The normally open blades of the switches are connected in parallel and between lines L1 and L2 in series with the coil of a relay CD that controls the aforementioned blades CD1, CD2 and CD3, and which coil is advantageously bypassed by signal light L1.

The normally closed blades of limit switches LS15 and LS16 are in series between lines L1 and L2 with a normally open push button PB10 and the coil of a relay CD. Relay CE controls blades CE1 and CE2, the latter of which forms a holding circuit bypassing push button PB10. Blade CE1 is connected between power lines L1 and L2 in series with valve solenoid P.

The aforementioned limit switches LS17 and LS18, one of which is actuated in each horizontal position of dogging member 50, each have one normally closed blade and one normally open blade. The normally open blades of limit switch LS17 and LS18 are connected in parallel and between lines L1 and L2 in series with a lamp L2.

The normally closed blades of limit switches LS17 and LS18 are connected in series with normally open push button PB1 and the coil of a relay CF between lines L1 and L2. Relay CF controls blades CF1 and CF2, the last mentioned of which bypasses push button PB11 and forms a holding circuit. Blade CF1 is connected between line L1 and the side of valve solenoid P, which is opposite line L2.

A further push button PB12 is connected between line L1 and the last mentioned side of valve solenoid P.

Valve solenoids D and E on one side are connected to line L2 and on the other side are connected to terminals T3a and T3b respectively of a momentary toggle switch T3 which has a moveable blade connected to line L1, and also to terminals T5a and T5b of a momentary toggle switch T5 which has a moveable blade arrangement connected to line L1.

Similarly, valve solenoids O and N are connected to terminals T5c and T5d respectively of toggle switch T5, and to terminals T4a and T4b, respectively, of momentary toggle switch T4, which has a moveable blade connected to line L1. Operation of toggle switch T3 will selectively energize one or the other of valve solenoids E and D, and operation of toggle switch T4 will selectively energize one or the other of valve solenoids O and N. Operation of toggle switch T5 will selectively energize valve solenoids E and O simultaneously, or valve solenoids D and N simultaneously.

A push button PB13 is connected between lines L1 and L2 in series with valve solenoid F and a momentary toggle switch T6 having a moveable blade connected to line L1. Toggle switch T6 has one contact connected through valve solenoid H with line L2 and a second contact connected through the coil of a relay CG with line L2. Energization of relay CG closes its blades CG1, which will only open after a certain delay period. This blade is connected between lines L1 and L2 in series with valve solenoid G.

Finally, a further signal lamp L3 is connected between lines L1 and L2 in series with a pressure switch PS which closes in response to the pressure supplied to cylinder 42 in a direction to close the dogs against the ends of a log.

Figure 9:
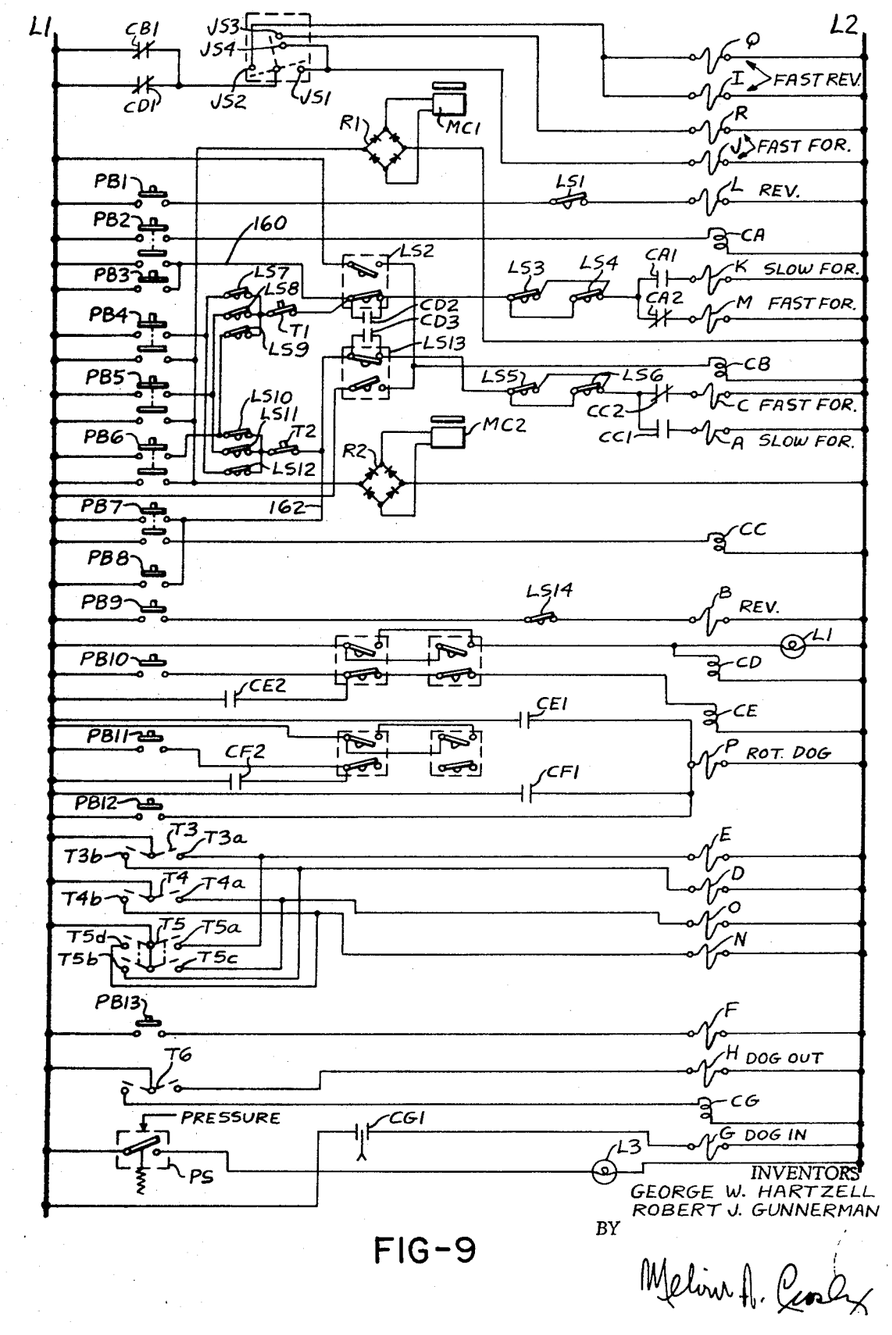
FIG. 9 is a schematic representation of the electric control circuit for the machine.
Figure 10:
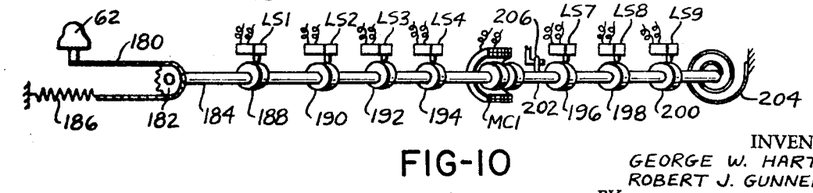
FIG. 10 is a view showing a portion of the control system.

Limit switches LS1 through LS14 referred to in FIG. 9 are actuated in accordance with an arrangement such as is illustrated in FIG. 10. FIG. 10 shows one husk 62 and illustrates a chain element 180 connected thereto which passes around a sprocket 182 on a cam shaft 184. The chain may be loaded by a spring 186 so that sprocket 182 and shaft 184 will rotate in conformity with the reciprocation of husk 62.

Shaft 184 carries cams 188, 190, 192 and 194 which control limit switches LS1, LS2, LS3 and LS4 respectively. Limit switch LS1 is normally closed and opens when the respective husk is retracted to a maximum limit thereby interrupting the energizing circuit for valve solenoid L.

Limit switch LS2 is operative when dogging member 50 is in a horizontal position. When the dogging member 50 is horizontal, the inward movement of the saw husk must be stopped before the main saw will strike the steel of the horizontally disposed dogging member 50.

When the dogging member 50 is in its horizontal position, neither of limit switches LS15 or LS16 are actuated and, therefore, relay CD is deenergized and its blades CD2 and CD3 are both open. Since blade CD2 is open, limit switch LS2 is effective for limiting the inward movement of husk 62 by controlling the supply of energy to valve solenoid M.

However, when dogging member 50 is in a vertical position, one of limit switches LS15 and LS16 is actuated, and relay CD is energized closing its blades CD2 and CD3 and making limit switch LS2 ineffective for stopping inward movement of saw husk 62 which will, instead, proceed inwardly until one or both of limit switches LS3 and LS4 is opened by cams 192, 194. The arrangement described thus provides for two inner stopped positions of the saw husk with the farthest in position corresponding to the vertical position of the dogging member 50.

The same arrangement is utilized for both of the saw husks with limit switches LS2, LS3 and LS4 limiting the movement of saw husk 62 and limit switches LS13, LS5 and LS6 limiting the movement of saw husk 64.

The circuit of FIG. 9 also provides for set movement of the saw husks, which is to say that means are provided whereby pressing of a push button will obtain a certain specific advancing movement of the saw husk, for example, a half inch or an inch or some other designated dimension. More particularly, three different amounts of such set movement are provided by the three switches PB4, PB5 and PB6.

These push button switches, as will be seen in FIG. 9, operate through limit switches LS8, LS9 and LS10. The limit switches, as will be seen in FIG. 10, are under the control of respective cams 196, 198 and 200, so that upon depressing a respective one of the push buttons, husk 62 will advance a certain fixed distance, whereupon the respective one of limit switches LS7, LS8 and LS9 will open and interrupt the supply of energy to valve solenoid M.

So that the same advance can be made repetitively, cams 196, 198 and 200 are mounted on a shaft 202 which is adapted to be clutched to shaft 184 by the electrically operated clutch MC1, which becomes energized as soon as any one of the aforementioned push buttons is depressed. When the push button is released, the clutch is deenergized to uncouple the shafts and a return spring 204 returns shaft 202 to a starting position which may be determined by the abutment means 206.

FIG. 10 shows the control arrangement pertaining to only one of the husks, namely, husk 62, but the other thereof is identical except that clutch MC2 is employed, and the cams control limit switches LS14, LS13, LS5, LS6, LS10, LS11 and LS12.

Either saw husk can be made inoperative by opening the one of toggle switches T1, T2 pertaining thereto.

If both toggle switches T1 and T2 are closed, both husks will move inwardly when a push button PB4, PB5, PB6 is closed.

Figure 11:
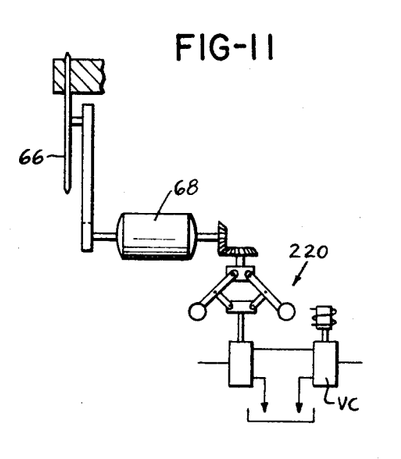
FIG. 11 is a fragmentary view showing a feature that can be included in the control system.

FIG. 11 schematically illustrates a modification in which a saw motor for either one or both of the saws has connected thereto fly ball governor valve 220, which is located in the oil supply line leading to the log carriage drive motor arrangement.

In FIG. 11, the arrangement is such that, if the saw motor slows down, indicating an excessive load thereon, the governor valve will be adjusted to bypass fluid away from the supply line leading to the log carriage drive motor arrangement and thereby slow down the log carriage. When the motor speed is restored, the governor valve will close, allowing full oil flow to the carriage drive motor and the carriage will gain speed back to maximum speed. The governor valve will, thus, have a modulating effect giving smooth speed changes.

A complete cycle of operations is carried out in the following manner. PB13 is closed to energize valve solenoid F, thereby to actuate the incoming conveyor to supply a log to the log cradles.

Toggle switch T5 is then operated to elevate the cradles and pick the log up. Toggle switches T3 and T4 are then selectively operated to bring the center of the log at both ends into dogging position.

Switch T6 is then closed to energize relay CG and close its blade CG1, which energizes valve solenoid G and actuates the moveable dog to clamp the log fixedly to the dogs. Switch T5 can now be availed of to lower the cradles, leaving the log hanging on the dogs in the log carriage.

Switch PB12 is now closed to energize valve solenoid P which causes dogging member 50 and the log to rotate. When the log is in the proper rotated position, switch T5 is availed of to lift the cradles to again support the log and switch T6 is again operated to energize valve solenoid H and release the log from the dogs.

The dogs are now rotated to the proper starting position by closing and then releasing PB11, which will energize solenoid coil CF through LS17 and LS18. Coil CF closes its contact CF1 and CF2, one of which provides a holding circuit at the relay coil, and the other of which energizes valve solenoid P to cause rotation of dogging member 50.

Valve solenoid P will remain energized until the dogging member 50 reaches one of its two horizontal positions when cam 132 will open one of limit switches LS17 and LS18 and thereby halt rotation of dogging member 50. The log can now again be fixed to the log carriage by actuating the dogs and the cradles are again lowered.

The operator now avails of switch JS to energize valve solenoids R and J to advance the carriage and the log therein rapidly toward the saws. Switch JS is released when the log is a short distance from the saws and one or both of the saw husks are then advanced toward working position. For example, by closing PB3, the pertaining husk moves forward at fast speed and will be stopped by releasing PB3 when the husk is a short distance from the desired position.

The push button PB2 is now closed, which energizes relay coil CA and closes its blades CA1 and opens its blades CA2, while energy is also supplied to valve solenoid K to provide for slow advance of the respective husk to working position.

If both saws are being used, the other saw husk is positioned in the same manner, utilizing PB8 and PB7.

Switch JS is now again actuated to energize valve solenoid J, providing for slow movement of the carriage and the log therein toward the saws. When the saws are started into the log, switch JS is moved to energize both of the valve solenoids R and J and the carriage will advance rapidly until the saws have cut throughout the length of the logs and removes two slabs or boards therefrom. Thereafter, switch JS is adjusted to energize valve solenoids I and Q and the carriage will return rapidly to starting position.

If it is desired thereafter to advance the saw husks by predetermined set increments, one of push buttons PB4, PB5 and PB6 is then pressed. If switch PB4 is actuated, clutches MC1 and MC2 will be energized, as will also valve solenoid M, and the husk will advance until limit switch LS7 is opened by its respective cam. Similarly, the other husk will advance until its limit switch LS12 is opened by a respective cam. The push button is held closed until the movement of the husks is arrested.

Push buttons PB5 and PB6 operate in the same manner through other limit switches, and provide for different increments of movement of the husks.

Repetitive cuts are taken from the log repeating the foregoing steps.

The dogging member 50 was in a horizontal position when sawing started, and when the main saws have advanced to the point that they would strike the dogging member, one or both of limit switches LS2 and LS13 are actuated and prevent further inward movement of the husks.

At this time, switch PB10 is closed and released, thereby energizing the coil of relay CE, which establishes a holding circuit for the relay through blade CE2 and brings about energization of the dog member rotating motor by energizing valve solenoid P through blade CE1. The dogging member and the log will then rotate until one or the other of limit switches LS15 and LS16 open, thereby deenergizing relay CE and bringing the log to a halt with dogging member 50 in a vertical position.

Further slabs or boards can now be taken from the log in the same manner as described above. The log can be sawed down to a point that the main saws are only about two inches apart, thus leading what is referred to as a "dog board" which can be ejected or released from the log carriage to the off bearing conveyor at the end of the mill opposite the log cradles. The carriage is now empty, ready to receive a further log.

As mentioned, opening of either of toggle switches T1, T2 will make the accompanying husk inoperative, so that the log can be sawed on one side only.

As to the edging saws, these can be adjusted manually toward and away from each other or can be controlled from the set works so as always to trim only the edge portions of the boards or slabs taken from the log. Further, the edging units are moveably supported on the respective husks, as by being slid thereto, so that they can be moved selectively between effective to ineffective positions.

It will be noted that energization of relay coil CB opens its blades CB1 in series with the moveable blade of switch JS to prevent operation of the carriage when either one of the saw husks has reached an inner limit position while dogging member 50 is in a horizontal position.

When the dogging member 50 is in a vertical position, relay CD is energized and closes its blades CD1, thereby again permitting a supply of energy to switch JS.

Modifications may be made within the purview of the appended claims.

What is claimed is:

1. A sawmill adapted for efficiently cutting a successive supply of logs, comprising elongated rail means including a tubular rail having two opposite pairs of substantially parallel side surfaces, frame means supporting said rail means in a substantially horizontal position, carriage means supported by said rail means and including depending members supporting a set of horizontally disposed opposing dog members adapted to engage opposite ends of each log, means for moving one of said dog members relative to the other to effect gripping and support of each log by said dog members, said carriage means including roller means engaging all four of said side surfaces of said rail to effect precision movement of said carriage means along said rail, at least one husk including a power driven cutting member positioned substantially parallel to a vertical plane extending through said rail, means for moving said husk laterally relative to said plane for positioning said cutting member relative to the path of the log, and means for moving said carriage means along said rail means.

2. A sawmill according to claim 1 in which said roller means comprises at least one roller having a resilient surface frictionally engaging a side of said rail, and means for reversibly driving said one roller to move said carriage in opposite directions along said rail.

3. A sawmill according to claim 1 in which said rail has two sides horizontal and two sides vertical, said roller means including nonyieldable rollers engaging the top side of said rail and drive roller means having resilient surface means thereon frictionally engaging the bottom side of said rail, and motor means operable for reversibly driving said drive roller means to move said carriage along said rail.

4. A sawmill according to claim 3 in which said motor means is embodied directly in said drive roller means.

5. A sawmill adapted for efficiently cutting a successive supply of logs, comprising elongated rail means, frame means supporting said rail means in a substantially horizontal position, carriage means supported by said rail means for longitudinal movement thereon, means for moving said carriage means along said rail means, at least one husk including a main cutting member positioned substantially parallel to a vertical plane extending parallel to said rail means, means for driving said cutting member, means supporting said husk for lateral movement in a direction normal to said plane, said carriage means including depending first and second brackets supporting corresponding first and second dog members positioned to engage opposite ends of each log, an elongated substantially horizontal shaft supported for rotation by said second bracket, said second dog member connected to one end portion of said shaft, a drive motor supported by said second bracket and connected to the opposite end portion of said shaft, means for operating said motor to effect rotation of said shaft and the log supported by said dog members, and the length of said shaft being sufficient to space said motor from said second dog member by a distance effective for said second dog member to pass said cutting member without said motor passing said cutting member when said carriage means travels on said track means.

6. A sawmill according to claim 5 wherein said motor is effective to rotate said shaft and said log through 360° to provide for quickly and precisely selecting the initial cutting position of the log.

7. A sawmill according to claim 6 including means for automatically stopping said motor after said shaft and the log are rotated by precisely 90° from said initial cutting position of the log.

8. A sawmill according to claim 7 wherein said motor comprises a hydraulic motor attached to said second bracket of said carriage.

9. A sawmill according to claim 7 wherein said means for automatically stopping said motor includes an actuating member connected to rotate with said shaft, and a plurality of control units for said motor and positioned to be successively operated by rotation of said actuating member.

10. A sawmill according to claim 9 which includes a pair of cradles at one end of said frame means spaced in the direction of the length of said frame means and adapted to receive a log thereon, and fluid operable means connected to each cradle for independent adjustment thereof in the vertical direction.

11. A sawmill according to claim 10 wherein said fluid operable means comprises plural hydraulic cylinders.

12. A sawmill adapted for efficiently cutting a successive supply of logs, comprising elongated rail means, frame means supporting said rail means in a substantially horizontal position, carriage means supported by said rail means for longitudinal movement thereon, means for moving said carriage means long said rail means, at least one husk including a cutting member positioned substantially parallel to a vertical plane extending parallel to said rail means, means for driving said cutting member, means supporting said husk for lateral movement in a direction normal to said plane, said carriage means including depending first and second brackets supporting corresponding first and second dog members positioned to engage opposite ends of each log, a substantially horizontal shaft supported for rotation by said second bracket, said second dog member connected to one end portion of said shaft, a motor supported by said second bracket and connected to the opposite end portion of said shaft, means for operating said motor to effect rotation of said shaft and the log through 360° for precisely positioning the log at an initial cutting position, and control means for precisely actuating and stopping said motor to produce precisely 90° rotation of said shaft and the log from said initial cutting position.

13. A sawmill according to claim 12 wherein said motor comprises a hydraulic motor, said control means includes solenoid actuated valve means for controlling the fluid to said motor, and means responsive to rotation of said shaft to effect actuation of said valve means.

14. A sawmill according to claim 12 wherein said husk includes a motor connected to drive said cutting member and supported for lateral movement within said cutting member.

15. A sawmill according to claim 12 including a set of parallel spaced base tracks extending laterally under the path of said carriage means, and a pair of opposing said husks and corresponding said cutting members mounted for lateral movement on said base tracks.

16. A sawmill adapted for efficiently cutting a successive supply of logs, comprising elongated rail means, frame means supporting said rail means in a substantially horizontal position, carriage means supported by said rail means and including depending members supporting a set of horizontally disposed opposing dog members adapted to engage opposite ends of each log, means for moving one of said dog members relative to the other to effect gripping and support of each log by said dog members, at least one husk including a cutting member positioned substantially parallel to a veritcal plane extending parallel to said rail means, means for moving said husk laterally relative to said plane, means for moving said carriage along said rail means between a log loading station and a log cutting station adjacent said cutting member, a set of cradle members positioned at said loading station under the path of said dog members, means supporting each of said cradle members for independent vertical movement, and means for independently moving said cradle members in the vertical direction for conveniently and precisely positioning the centerline of each log in substantial horizontal alignment with said dog members.

17. A sawmill according to claim 16 wherein said means supporting each said cradle member comprise a substantially vertical fluid cylinder disposed under said cradle member.

18. A sawmill according to claim 16 including generally horizontal and laterally extending endless conveyor means extending inwardly substantially to said cradle members for successively loading the logs into said cradle members.

19. A sawmill adapted for cutting a successive supply of logs, comprising a rotatively driven cutting member, carriage means adapted to support a log, elongated rail means supporting said carriage means for linear movement along a path adjacent said cutting member, fluid drive means for moving said carriage means along said path at a variable speed to feed the log longitudinally into said cutting member, valve means for controlling the fluid supplied to said fluid drive means to vary the rate at which the log is fed into said cutting member, governor means connected to sense the speed of rotation of said cutting member, and said valve means being actuated in response to operation of said governor means to effect rotation of said cutting member at a substantially constant predetermined speed during the cutting of the log.

* * * * *